United States Patent
Barragan

[11] 3,873,030
[45] Mar. 25, 1975

[54] ONE-PIECE DRIP IRRIGATION DEVICE
[76] Inventor: Jaime Suhagun Barragan, Calle del Teco 287, Zamora, Michoacan, Mexico
[22] Filed: Feb. 19, 1974
[21] Appl. No.: 443,660

Related U.S. Application Data
[63] Continuation of Ser. No. 288,629, Sept. 13, 1972, abandoned.

[30] Foreign Application Priority Data
July 17, 1972  Mexico .............................. 137086

[52] U.S. Cl. .................................. 239/542, 138/42
[51] Int. Cl. .................................. B05b 1/30
[58] Field of Search ....... 239/145, 542, 547; 138/42

[56] References Cited
UNITED STATES PATENTS
3,604,728  9/1971  Symcha et al. ............... 239/542 UX
3,667,685  6/1972  Rinkewich ......................... 239/542
3,729,142  4/1973  Rangel-Garza et al. ........ 239/547 X Primary Examiner—M. Henson Wood, Jr.
Assistant Examiner—Michael Mar

[57] ABSTRACT

A one-piece drip irrigation device for attachment to a perforated wall of an irrigation liquid supply pipe, said device comprising a casing having side and bottom walls and a flange extending outwardly from the edges of an open wall of same, said flange when attached to the pipe wall constituting an enclosed housing having a multiplicity of alternate walls that form a passage provided with a multiplicity of obstacles to free flow of liquid and including in one of its ends a perforation for liquid exit at lowered pressure.

1 Claim, 3 Drawing Figures

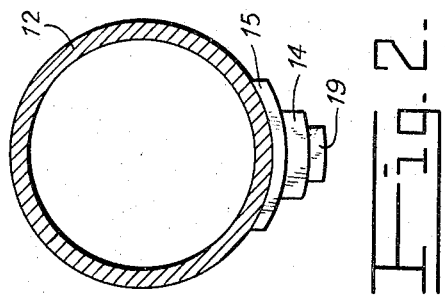
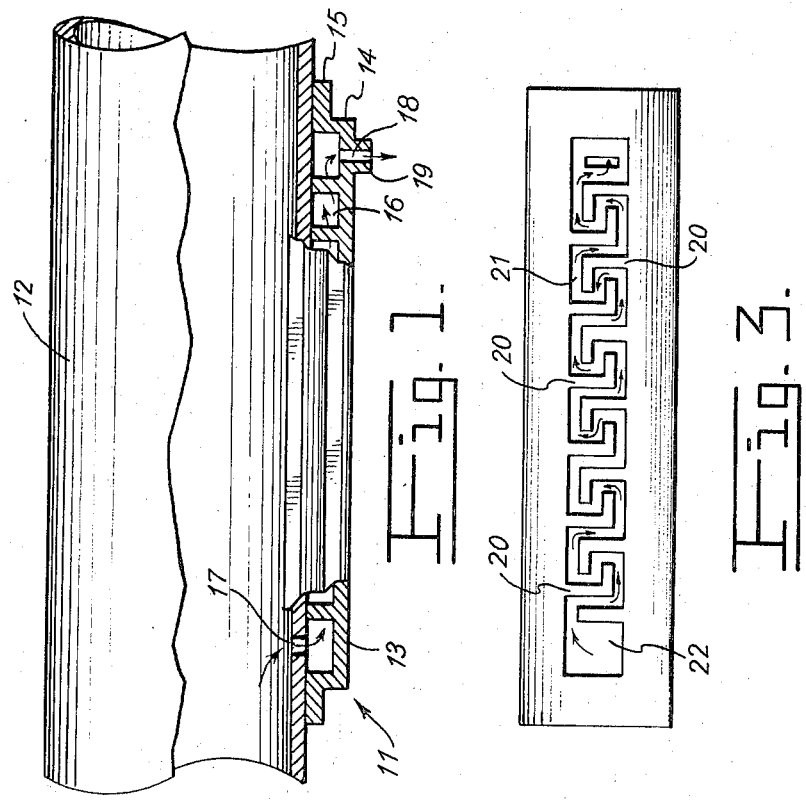

ONE-PIECE DRIP IRRIGATION DEVICE

This is a continuation of application Ser. No. 288,629, filed Sept. 13, 1972, now abandoned.

BACKGROUND OF THE INVENTION

This invention relates in general to drip irrigation means and is particularly concerned with a one-piece drip irrigation device which might be bonded to the irrigation liquid dispensing pipes.

Recently, and irrigation system, known as drip irrigation system has been developed, consisting in supplying a controlled amount of irrigation liquid to the surroundings of the plants, in order to preserve the necessary moisture in same with minimum liquid consumption.

In order to carry out the above, use is made of flexible pipes laid along the rows of plants, including droppers connected at suitable locations for controlling liquid exit.

Notwithstanding the above, the drip systems known heretofore are only applicable, from an economic viewpoint, to crops such as fruit trees, the density of which may be from 100 to 500 plants per hectare, in which event the cost of the required droppers and the installation of same, is feasible. Conversely, in furrow cropping, in which the quantity of plants per hectare may amount to 100,000 or more, these known systems are prohibitively expensive, due to the large number of droppers required and the tedious task of connecting such a tremendous number of droppers in the pipes.

BRIEF SUMMARY OF THE INVENTION

According to the above, an object of this invention is to provide a drip irrigation device comprised of only one piece thereby lowering the manufacturing, installation and operating costs of the systems, as well as expediting the time required for their installation.

Another object of the invention is to provide a superimposed drip irrigation device, of the patch type, that can be attached to the pipe in any position desired, either longitudinally in relation to the pipe or at the periphery of same. In accordance with the present invention, a one-piece drip irrigation device is provided for attachment to an irrigation pipe over a perforation in the wall of said pipe, comprising a one-piece elongated casing member with a curved cross-section corresponding to the radius of the outside of the pipe walls, said casing member having a curved bottom wall and side walls of uniform height extending around the edges of said bottom wall, and having a multiplicity of internal walls of the same height as the side walls arranged to form passages providing a multiplicity of obstacles to liquid flow, the tops of said side and internal walls engaging with the outer walls of the pipe when the device is attached to the irrigation pipe, an outlet hole being provided in said casing member to distribute liquid from said irrigation pipe at lowered pressure after passing through said passages.

Thus, the beginning of the passage through which the irrigation liquid will flow into the device of the invention will register with a hole made in the irrigation liquid dispensing pipe. Depending on the length of the passage through which the irrigation liquid flows to the exhaust hole, the pressure of same will be greater or lesser.

These and other objects achieved through the practice of the invention, will be better understood and appreciated upon reading the following description, in which reference is made to the enclosed drawing of a preferred embodiment of same.

DETAILED DESCRIPTION OF THE DRAWINGS

FIG. 1, is a vertical elevational view with detailed longitudinal sections, showing the one-piece drip irrigation device of this invention, bonded to the irrigation liquid dispensing pipe, pointing out by the arrows, the liquid flow through same.

FIG. 2, is an end vertical elevational view of the device of this invention, bonded to a dispensing pipe shown in cross section.

FIG. 3, is an upper plan view of the drip irrigation device of this invention, where the irrigation liquid flow is pointed out by arrows.

DETAILED DESCRIPTION OF THE INVENTION

The one-piece drip irrigation device of the present invention, is comprised of a casing or patch 11, bonded to the irrigation liquid dispensing pipe 12. Said casing 11, includes bottom walls 13, and side walls 14, with an open end bonded by means of peripherical flanges 15 to said dispensing pipe, forming an enclosed housing 16, through which interior the irrigation liquid, emerging from a hole 17, made in pipe 12, flows.

The outlet hole of the device, may be located in any other desired point such as the hole 18 through a nozzle 19 at the end of same. Housing 16 includes a multiplicity of alternate walls 20, perpendicular to pipe 12, that form a passage 21 that includes a multiplicity of obstacles to the flow of liquid provided by said walls, compelling the liquid to follow through a path having multiple collisions and turns up to approximately 90°, thereby obtaining a drop in pressure, in order to supply dropwise the irrigation liquid at a suitable location in the furrow. The end of passage 21 comprising the receiving cavity 22, registers with the perforation 17 in pipe 12, through which the irrigation liquid by-passes, crossing the entire passage 21, loosing pressure at every collision and turn until finally emerging from the perforation 18 located at the other end of passage 21. The casing or patch 11, is joined to the pipe by any known means and includes a distribution of the walls 20 in any possible pattern. The optimum pattern is that which provides a maximum number of changes in the direction of the liquid flow promoting more collisions in the least possible space.

Eventhough, the above description has been made as regards the preferred embodiment of the invention, those skilled in the art will understand that any amendment in the form or detail, such as the positioning of the walls that form the passage for the irrigation liquid, is considered embodied in the spirit and scope of same.

I claim:

1. A one-piece drip irrigation device for attachment to an irrigation pipe over a perforation in the wall of said pipe, comprising a one-piece elongated casing member with a curved cross-section corresponding to the radius of the outside of the pipe walls, said casing member having a curved bottom wall and side walls of uniform height extending around the edges of said bottom wall, and having a multiplicity of internal walls of the same height as the side walls arranged to form passages providing a multiplicity of obstacles to liquid flow, the tops of said side and internal walls engaging with the outer walls of the pipe when the device is attached to the irrigation pipe, an outlet hole being provided in said casing member to distribute liquid from said irrigation pipe at lowered pressure after passing through said passages.

* * * * *